United States Patent
Xiang et al.

(10) Patent No.: US 7,271,574 B2
(45) Date of Patent: *Sep. 18, 2007

(54) EVANESCENT MICROWAVE PROBE WITH ENHANCED RESOLUTION AND SENSITIVITY

(75) Inventors: Xiao-Dong Xiang, Danville, CA (US); Haitao Yang, San Jose, CA (US); Gang Wang, San Jose, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/180,045

(22) Filed: Jul. 11, 2005

(65) Prior Publication Data

US 2006/0125465 A1    Jun. 15, 2006

Related U.S. Application Data

(60) Provisional application No. 60/587,311, filed on Jul. 12, 2004.

(51) Int. Cl.
    G01R 31/02    (2006.01)
(52) U.S. Cl. .................. 324/72.5; 324/72; 324/715; 324/754
(58) Field of Classification Search .............. 324/72, 324/72.5, 715, 754
    See application file for complete search history.

(56) References Cited

U.S. PATENT DOCUMENTS 3,624,240 A * 11/1971 Damm et al. ............... 376/143

| | | | | |
|---|---|---|---|---|
| 6,173,604 B1 * | 1/2001 | Xiang et al. | ................... | 73/105 |
| 6,532,806 B1 * | 3/2003 | Xiang et al. | ................... | 73/105 |
| 6,597,185 B1 * | 7/2003 | Talanov et al. | ............. | 324/638 |
| 6,693,426 B1 * | 2/2004 | Xiang et al. | ................ | 324/300 |
| 6,725,095 B2 * | 4/2004 | Fenn et al. | ................. | 607/101 |
| 2003/0155934 A1 * | 8/2003 | Moreland et al. | ........... | 324/629 |

OTHER PUBLICATIONS

Fink, Standard Handbook for Electrical Engineers, 1968, 10th Edition, McGraw-Hill, p. 4-136 to 4-141.*
Magid, Electromagnetic Fields, Energy and Waves, 1972, 1st Edition, John Wiley & Sons, p. 578-583.*

* cited by examiner

*Primary Examiner*—Anjan Deb
*Assistant Examiner*—Thomas Valone
(74) *Attorney, Agent, or Firm*—Buchanan, Ingersoll & Rooney

(57) ABSTRACT

Novel systems of an evanescent microwave probe (EWP) are disclosed, which enable measurements of physical properties of a sample with enhanced sensitivity and resolution, simultaneously. In one embodiment, new shielding features are added to the probe (which may be of either a sharpened tip or loop configuration) to reduce the effects of residual far field radiation, while maintaining the probe section that extends beyond the shielding aperture of the resonator. To further increase the sensitivity of the instrument, an automatic gain-controlled active feedback loop system may be added to the probe resonator to form a self-oscillator. This new active circuit feature significantly increases the effective Q of the resonator probe, enhancing the sensitivity of both the frequency and Q measurement.

9 Claims, 8 Drawing Sheets

EVANESCENT MICROWAVE PROBE WITH ENHANCED RESOLUTION AND SENSITIVITY

PRIORITY CLAIM

This Application claims priority to U.S. Provisional Patent Application No. 60/587,311, filed Jul. 12, 2004, entitled Evanescent Microwave Probe with Enhanced Resolution and Sensitivity.

BACKGROUND OF THE INVENTION

1. Field of the Invention

Embodiments of the present invention are directed in general to high resolution and high-sensitivity detection and/or profiling of the electromagnetic impedance of a substance. More specifically, the present invention is directed to systems and methods that use an evanescent wave probe.

2. State of the Art

In the discussion of the state of the art that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

Classical Limitations

From classical microscopy theory, the diffraction-limited resolution of a microscope is primary determined by the wavelength of the wave used to interact with the sample. For example, the smallest feature that an optical microscope can resolve is about:

$$\delta = 0.61 \frac{\lambda}{NA}$$

where $NA = n \sin\theta$ is the numerical aperture, n the refractive index of media, $\theta$ the aperture angle of the objective, and $\lambda$ the wavelength of the electromagnetic radiation interacting with the sample. Since the wavelength of GHz microwave is in centimeter range, the limited resolving ability of a classical diffraction-limited microscope prevents RF/microwave electromagnetic properties (which include electric impedance) of small sized samples such as arrayed samples on a high density materials chip from being characterized. These conclusions are based on classical propagating wave theory.

Evanescent Waves

The term evanescent wave in the context of this disclosure refers to electromagnetic waves with wave-vectors having an imaginary component that does not originate from dissipation. In electromagnetic wave theory, evanescent waves are the photonic equivalent of electron waves in quantum mechanics existing within a classically forbidden region (in other words, within a barrier). In the far-field description of electromagnetic waves, an orthogonal eigenfunction set of Hilbert space is chosen as the plane waves whose wave vectors are any real number satisfying the Helmholtz equation, and as a consequence, they are propagating waves.

Any propagating wave (for example, a propagating spherical wave) can be expanded as the superposition of such plane waves. The magnitudes of the wave vectors are determined soley by the frequency and speed of light in accordance with the Helmholtz equation, i.e. $k = 2\pi f \sqrt{\epsilon\mu} = 2\pi/\lambda = \sqrt{k_x^2 + k_y^2 + k_z^2}$. For propagating waves, $k_x$, $k_y$, and $k_z$ are real numbers and thus must be smaller than k (in free space, $k = k_0$). These waves only have a resolving power on the order of $\lambda$. However, these plane waves cannot construct, for example, a spherical wave whose wave front has a radius less than the wavelength $\lambda$. Therefore, a true complete set of Hilbert space should include plane waves whose wave vectors are any complex number satisfying the Maxwell equation to construct such a spherical wave. Since imaginary wave vectors are allowed, the components ($k_x$, $k_y$, $k_z$) can then be any value and still satisfy the Maxwell equation.

The "plane waves" here whose lateral components $k_r = \sqrt{k_x^2 + k_y^2}$ are larger than k will have a higher lateral resolving power, the resolving power being on the order of $1/k_r$. However, since they must have imaginary components $k_z$ to satisfy the Helmholtz equation, they are "evanescent," and cannot propagate much further than a distance corresponding to a wavelength $\lambda$. A metal sphere or tip fed by a wave source with a radius of $R_0$ ($<<\lambda$) will generate evanescent waves that form a spherical wave on the metal surface satisfying the boundary conditions, where the sperical waves have wave vectors ranging up to $k_r \sim 1/R_0$, and resolving power up to $\sim R_0$. Interaction between the tip and sample (where the sample may have a high effective dielectric constant) may further increase the resolving power. For example, if g is the distance between the tip and the sample, resolutions on the order of $\sqrt{gR_0}$ may be obtained for for conducting materials as a result of decreasing the effective tip radius from polarizing effect. Since these waves decay over a distance $R_0$ in free space, the sample has to be brought to within $R_0$ of the tip to realize a strong interaction. Note these waves are not necessarily evanescent in conducting materials since the wave vector $k_c = 2\pi f\sqrt{\epsilon\mu(1+i\sigma/\omega\epsilon)}$ is many orders of magnitude larger than that in free space.

Evanescent Wave Probes

Evanescent wave probes (EWP) refer to probes that emit evanescent electromagnetic waves. An instrument configured to scan an EWP across the surface of a sample constitutes an evanescent-wave microscope, which may be classified as one type of a scanning probe microscope (SPM). The first scanning probe microscope was probably the evanescent photon microscope envisioned by E. H. Synge in 1928. Fraint and Soohoo independently demonstrated this idea at microwave frequencies in 1959 and 1962, respectively, although the work by Ash and Nicholls 10 years later is often credited in literature. In recent years many different types of SPMs have been proposed and developed, largely due to the impact of the invention of the scanning tunneling microscope (STM), which itself may be viewed as an evanescent de Broglie wave microscope.

Until recently, carrying out methods of microscopy to quantify various materials properties, such as complex dielectric constant and electrical conductivity, have been virtually impossible. The difficulty arises from two major barriers. First, in all SPMs the microscopy signal is a convolution of topography and physical properties. Separating them requires measuring at least two independent signals simultaneously. The development of the scanning near-field optical microscope (SNOM) provided this capability by implementing shear force detection in addition to optical signal detection. Second, a detailed field configuration in the tip-sample region has to be solved, which subsequently gives rise to solutions that relate the signals explicitly to tip-sample distance and physical properties. These relations can then also be used for tip-sample distance feedback control to obtain simultaneously quantitative topography and physical property images. Although numerical methods based on finite element analysis have been used to solve the field distribution around a SNOM tip, the approach is not practical in routine applications.

In order to make measurements of the electrical impedance of a material, which would be tremendously useful to a broad range of applications, the evanescent (or near-field) microwave microscopy was suggested. Previous efforts took advantage of aperture or tapered waveguide probe configurations but when operating below the cut-off frequency, these probes suffer severely from waveguide decay. For example, tapered waveguide probes were widely used in NSOM, though they suffered from a typical attenuation of $10^{-3}$ to $10^{-6}$. As realized by Soohoo in 1962, a linear improvement in resolution can result in an exponential reduction in sensitivity. As a result, it is very hard to reconcile the conflict between resolution and sensitivity. Chu realized the conflict, and suggested using a transmission line probe with a reduced cross-section and sharp tip in 1988. However, as the resolution is also determined by the cross-section of the transmission line probe, further improvement to sub-micron resolution (if practical) still causes significant transmission line decay. Meanwhile, the unshielded far-field components around the tip in the transmission line probe significantly limit the resolution and capability for carrying out quantitative analysis.

It is perhaps beneficial to provide a historic perspective that to the best of the inventors' knowledge, outlines the various techniques, and efforts that have been made in the field. Frait and Soohoo were the first to independently demonstrate, in 1959 and 1962, respectively, similar evanescent microwave microscopes using the microwave cavity with a small aperture. Soohoo used the instrument to study the local properties of magnetic materials based on the ferromagnetic resonant absorption of microwaves. He was also the first to realize the conflict between spatial resolution and sensitivity that is inherent when taking the aperture approach. Bryant and Gunn (1965) were probably the first to use a tapered coaxial transmission line probe to study the local conductivity of materials, achieving a resolution of 1 mm. Ash and Nicholls published a paper in 1972 emphasizing the aperture approach. They are probably the first to demonstrate the super-resolution on dielectrics (although they were often mistakenly credited in the literature as having been the first to demonstrate the feasibility of an evanescent microwave microscope). In 1984, Massey discussed microscopy with scanned evanescent waves from an aperture, and tested the theory at 450 MHz.

A variety of studies have been published in the literature that investigated the resolution that is possible in metals. These reports are misleading, however, since the wavelength of microwaves in metals is at least four orders of magnitude smaller than in air, and smaller than the resolution those studies demonstrated.

It is doubtful these early pioneers were aware of the theoretic proposal made by Synge in 1928, and were probably not even aware of each other's work.

In 1988, Fee, Chu and Hansch published a paper that explicitly pointed out the limitation of the aperture type probe in near-field microscopy, and suggested using a coaxial transmission line with a very small cross section to obtain high resolution with significantly less loss. They also tested such a probe on metal, and pointed out that protruding and sharpening the center conductor of the probe could improve resolution. Wang et al in 1987 and 1990 demonstrated an evanescent microwave microscope based on a scanned tapered open (electric dipole) and closed (magnetic dipole) end of a microstrip resonator. Tabib-Azar et al. in 1993 discussed a similar approach. Several other groups have been actively implementing transmission line type probes in evanescent microwave microscopy studies, including van der Weide et al. and Anlage et al.

Recently, there has been renewed interest in designing new cavity and/or waveguide based structures. Golosovsky and Davidov, in 1996, demonstrated an open narrow slid structure in a waveguide, similar to what Gutmann et al. demostrated in 1987. These designs exhibit a much improved energy transmission relative to the aperture structure. Bae et al. discussed a similar approach in 1997. Grober et al proposed yet another bow-tie antenna structure as the scanning probe.

Thus it may be seen that much effort has been devoted to improving resolution and sensitivity in evanescent wave microwave microscopes, with specific attention having been given to probe design. Although advances have been made, there is still a need in the art for improvement such that resolution may be enhanced simultaneously with sensitivity.

SUMMARY OF THE INVENTION

Embodiments of the present invention are directed to a novel evanescent microwave probes (EWP) designed to measure physical properties of a sample with enhances sensitivity and resolution, simultaneously. In one embodiment, new shielding features are added to the probe (which may be of either a sharpened tip or loop configuration) to reduce the effects of residual far field radiation, while maintaining the probe section that extends beyond the shielding aperture of the resonator. It will be understood by those skilled in the art, however, that the quality factor (Q) of the resonator may decrease, sometimes significantly, after the inventive shielding structures are added. A reduced quality factor may reduce the sensitivity of the probe system. To overcome this sensitivity issue caused by the novel shielding feature, an automatic gain-controlled active feedback loop system may be added to the probe resonator to form a self-oscillator. This new active circuit feature significantly increases the effective Q of the resonator probe, enhancing the sensitivity of both the frequency and Q measurement. The integrated EWP having the inventive shielding and active circuit feedback loop enhances both resolution and sensitivity simultaneously, an effect which is contemplated to enable many applications in materials and biotechnology areas.

An evanescent wave probe (referred to herein as an "EWP") is defined as a probe that emits substantially only an evanescent wave, which is a non-propagating wave. An evanescent wave as defined herein is an electromagnetic wave with an imaginary component in its wave vector. One type of evanescent wave probe operates at microwave frequencies, and thus may be called an evanescent microwave probe (or "EMP"), but the probe may function at other frequencies as well. Another type of evanescent wave probe operates at radio frequencies (RF). Various embodiments of shielding and feedback loops that are disclosed herein are described in the context of an EMP, but it will be understood by those skilled in the art that an evanescent wave probe of any frequency may be used to carry out embodiments of the present invention.

DETAILED DESCRIPTION OF THE INVENTION

The present inventors have developed a novel scanning evanescent microwave probe (SEMP) having a shielding structure that is designed to confine propagating far-field components to the resonant cavity. Thus, only non-propagating evanescent waves are generated at the tip of the probe. The inventors had also developed theoretical models to obtain near-field analytical solutions to the relevant mathematical equations, the models allowing for quantitative measurements to be made of the electrical impedance of materials in the microwave domain with sub-micron resolution. These developments represented significant progress in the field of non-destructive and quantitative electrical impedance measurements, and they could be applied to a wide range of materials ranging from insulating dielectrics, to semiconductors, to highly conducting metals. The EMP disclosed previously emits evanescent microwaves into the sample via a conducting tip that is part of the probe; the same tip of the probe then detects the result of the interaction of the evanescent waves with the sample. The interaction of the evanescent waves with the sample causes changes in the resonant frequency and quality factor of the microwave resonator. The electrical impedance being measured is complex in mathematical terms; that is to say, the impedance includes both real and imaginary components.

Figure 1:
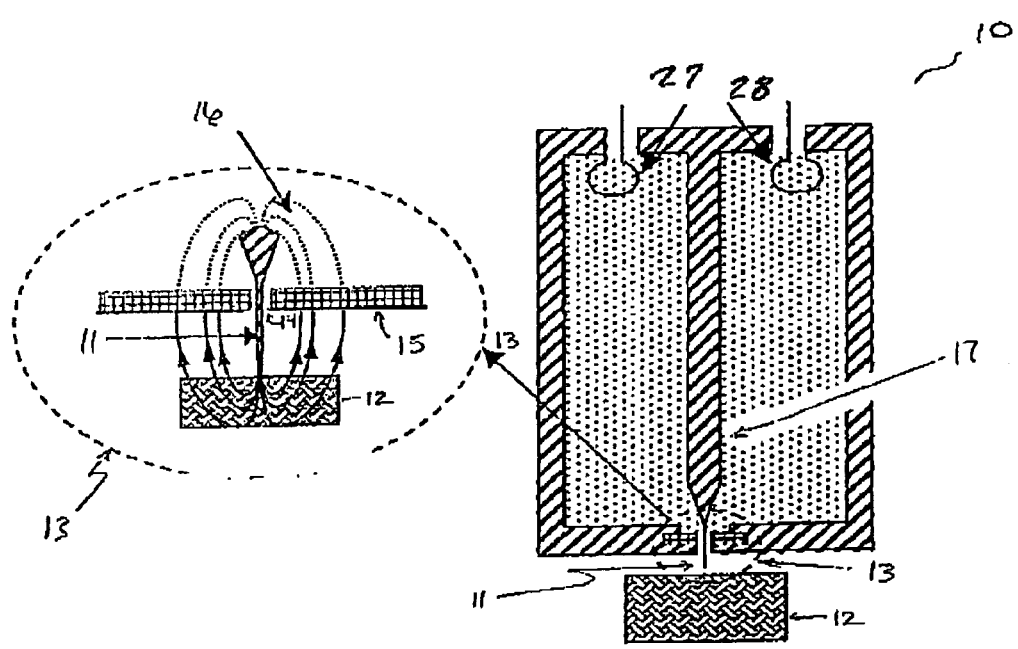
FIG. 1 illustrates the evanescent wave technique in general, showing an exemplary evanescent wave probe (EWP) positioned adjacent to a sample, with electrical field lines emitted from the tip of the probe interacting with the sample.

The essence of the technique relies on creating relatively pure evanescent microwaves near the tip of the probe, while simultaneously maintaining a high quality factor of the microwave sensor (i.e., the resonator). An exemplary EMP system is shown generally at 10 in FIG. 1. One embodiment of the probe's design is based upon a high quality factor (Q) microwave coaxial resonator with a sharpened metal tip 11 mounted on a center conductor 17. Referring to FIG. 1, the region around the tip 11 and sample 12 has been enlarged as a "zoomed in" region 13. The tip 11 extends beyond an aperture 14 formed on a thin metal shielding end-wall 15 of the resonator. Since the tip size is much smaller than the wavelength of the microwave, non-propagating evanescent waves 16 are generated at the tip. Only when the tip 11 is in a close range to the sample 12 will the evanescent waves 16 from the tip interact with the sample materials. Interaction of the evanescent waves with the sample give rise to resonant frequency and Q changes of the cavity, and consequently the microscopy of the electrical impedance.

The novel scanning evanescent microwave probe (SEMP) developed by the inventors has, ideally, a shielding aperture that is small, and a tip section that extends outside the aperture that is short, to achieve the best shielding effects. However, in practice these effects are difficult to achieve since a large flat probe surface is difficult to scan over the flat surface of a sample without damaging the sample. In previous embodiments of the present inventors' microscope, the tip section that extended outside the shielding aperture had been restricted to a few mm in length to achieve the scanning function. A further advantage of lengthening the tip was an enhanced ability to implement and monitor a desired tip-sample distance through atomic force sensing. Extending this tip section, however, may create a measurable far field effect, which can be detrimental to quantitative metrology applications. In particular, extending the tip section may reduce the true spatial resolution of the instrument.

An Evanescent Microwave Probe Transmission Line Resonator

Embodiments of the present invention may in general be described in conjunction with the evanescent microwave probe (EWP) depicted in FIGS. 2-5. The probes shown schematically in FIGS. 2-5 are constructed with a $\lambda/4$ transmission line resonator, where the transmission line may be constructed from multiples of a quarter wavelength (expressed as n $\lambda/4$). Two examples of such transmission line resonators are coaxial resonators and microstrip resonators. The exemplary probes have an electrically conducting tip connected to a central conductor, a loop connected between the center conductor and ground shielding, or cavity type resonator if the evanescent wave probe is an aperture type.

To achieve high spatial resolution, it is advantageous to shield the propagating wave (which may also be called the far-field) that emanates directly from the resonator, since the far-field and/or propagating wave energy will interact with the sample in a broad region, generating a large background noise on top of the desired signal. This noise can dominate the contribution from the evanescent field that contains the high spatial resolution information from the sample. Prior art designs have employed an aperture like shielding structure to reduce far field wave components from emitting from the resonator. One disadvantage of this approach, however, is that the straight portion of the tip of the probe that protrudes from the aperture still has the potential to contribute significant far field components to the energy emitting from the probe, and this may limit the EMP from reaching a desired spatial resolution.

Exemplary Evanescent Microwave Probes

Figure 2:
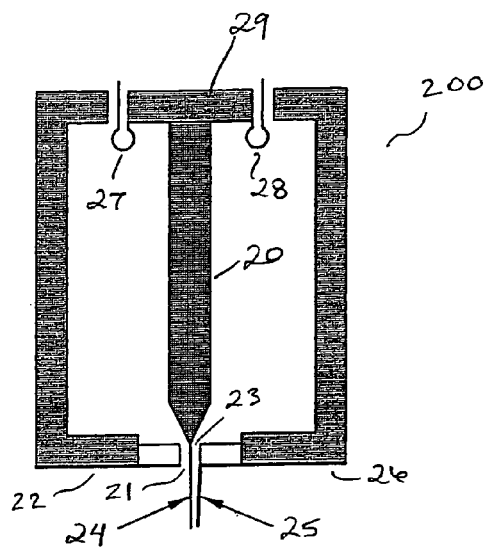
FIGS. 2-5 illustrate various exemplary embodiments of the EWP cavity and probe tip and loop structures, some protected by ground wires, and some shielded.

An exemplary evanescent wave probe is shown schematically in FIG. 2. Referring to FIG. 2, a center conductor 20 extends through a small aperture 21 in the shielding endwall 22 of the resonator shown generally at 200. The center conductor 20 is formed into a tip 23. Depending on the length of the outside portion 24 of the tip 23, the oscillating current flowing along the tip 23 will produce RF radiation to a scale much larger than the size of tip 23, which will decrease the EMP space resolution. To reduce the far-field radiation effect, a grounded metal wire 25 is connected to the cavity shielding 26 and placed adjacent to the center conductor 20 at the outside portion 24 of the tip 23. The construction of the evanescent wave probe 200 limits the electromagnetic field effectively between the tip 23 and the ground wire 25 and increases the space resolution dramatically.

Referring again to FIG. 2, the evanescent wave probe 200 optionally includes a first loop 27 on an end-wall and a second loop 28 on an end-wall. The end-wall can be any end-wall, such as second end-wall 29 opposite end-wall 22. The first loop 27 and second loop 28 can each, independently and optionally, be connected to a source for electromagnetic energy, such as a RF generator, or a detector for electromagnetic energy, such as a RF detector (the source and detector not shown in FIG. 1). The loops 27 and 28 provide for inductive coupling of electromagnetic radiation, e.g., RF, microwave and the like, into and out of the evanescent wave probe 200. Optional, one or more of the loops 27 and 28 can be replaced with capacitive elements or with direct electrical connections to capacitively or directly couple electromagnetic radiation into and out of the evanescent wave probe 200.

The evanescent wave probe 200 shown in FIG. 2 can operate in a variety of modes. For example, when it is connected just to a detector for sensing electromagnetic energy, it operates in a passive mode and detects a signal. When connected to a source of electromagnetic energy, the evanescent wave probe 200 operates in an active mode to further generate an evanescent wave.

Figure 3:
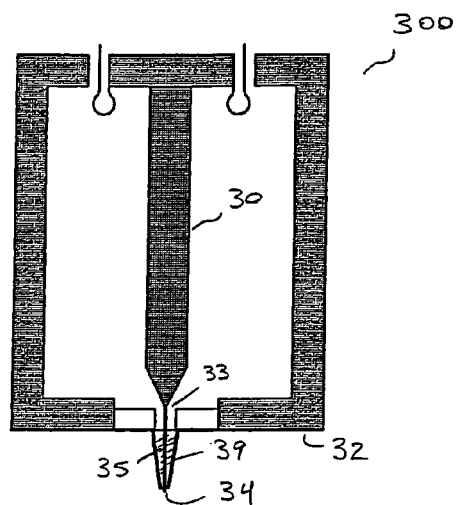

An alternative embodiment of the evanescent wave probe is shown in FIG. 3. Instead of having a grounded wire, the evanescent wave probe 300 illustrated in FIG. 3 has a tip 33 connected to a center conductor 30, wherein the tip 33 has an outside portion 34 surrounded by low loss insulating material 35. The insulating material 35 is then coated with a layer of conductive material 39, which is electrically connected to the cavity shielding at, for example, end-wall 32. The structure illustrated in FIG. 3 substantially eliminates far-field RF radiation, and has better resolution than a two wire structure.

Figure 4:
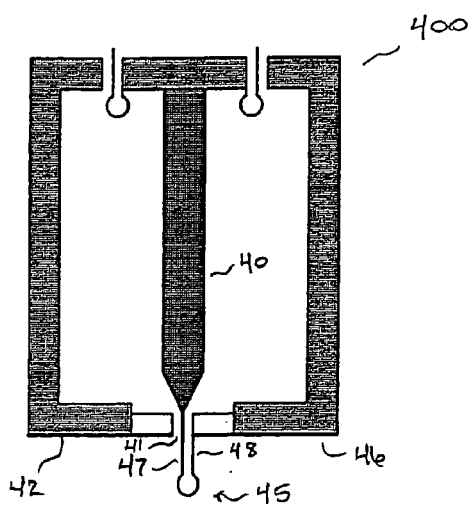

The tip of the evanescent wave probe cavity can optionally be replaced with a conductive loop 45 as shown generally with the exemplary probe 400 of FIG. 4. In this embodiment, one side 47 of the conductive loop 45 is connected to the center conductor 40, and another side 48 is connected to the cavity shielding 46, at, for example, end-wall 42. The conductive loop 45 extends beyond an aperture 41. The aperture 41 can be formed within a thinned metal shielding portion of end-wall 42, and it may connect back to the end-wall 42 to form a λ/2 resonator.

Referring again to the exemplary embodiment of FIG. 4, the conductive loop 45 can be either a single-loop structure or a multiple-loop coil. Also, the evanescent wave probe can be used for NMR/ESR signal excitation and detection. The oscillating magnetic field inside the sample produced by the one or more conductive loops is in a horizontal direction, which is perpendicular with the external static magnetic field. Because the current flowing in the two wires connecting the loop is in opposite direction with each other, the RF radiation emitted by these two wires will effectively cancel each other to a very low level. Thus, only the portion of the sample immediately under the loop will be sensed. Compared to the tip structures illustrated in FIGS. 2 and 3, the loop probe in FIG. 4 is more sensitive to a magnetic signal, but has a lower resolution.

Figure 5:
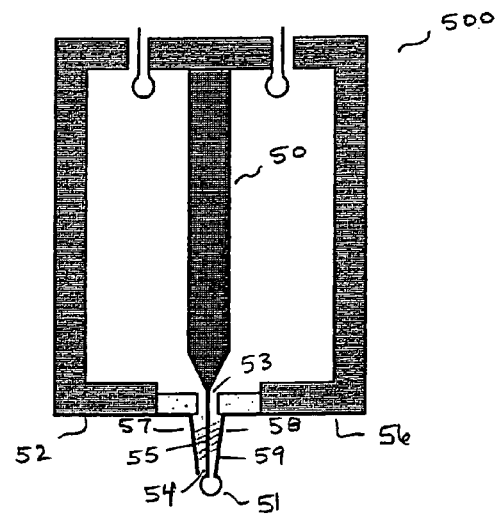

An alternative embodiment of the evanescent wave probe is shown in FIG. 5. The evanescent wave probe shown generally at 500 in FIG. 5 combines elements of the probe 300 in FIG. 3 and the probe 400 in FIG. 4; namely, the low loss insulating material of the probe 300, and the conductive loop of probe 400. Referring to FIG. 5, the probe 500 has a tip 53 connected to a center conductor 50, wherein the tip 53 has an outside portion 54 surrounded by low loss insulating material 55. The insulating material 55 is then coated with a layer of conductive material 59, which is electrically connected to the cavity shielding at, for example, end-wall 52. Additionally, the probe 500 has conductive loop 51, with one side 57 of the conductive loop 51 connected to the center conductor 50, and another side 58 is connected to the cavity shielding 56, at, for example, end-wall 52. The conductive loop 51 extends beyond an aperture in the end-wall 52. The aperture can be formed within a thinned metal shielding portion of end-wall 52, and it may connect back to the end-wall 52 to form a λ/2 resonator.

Figure 6:
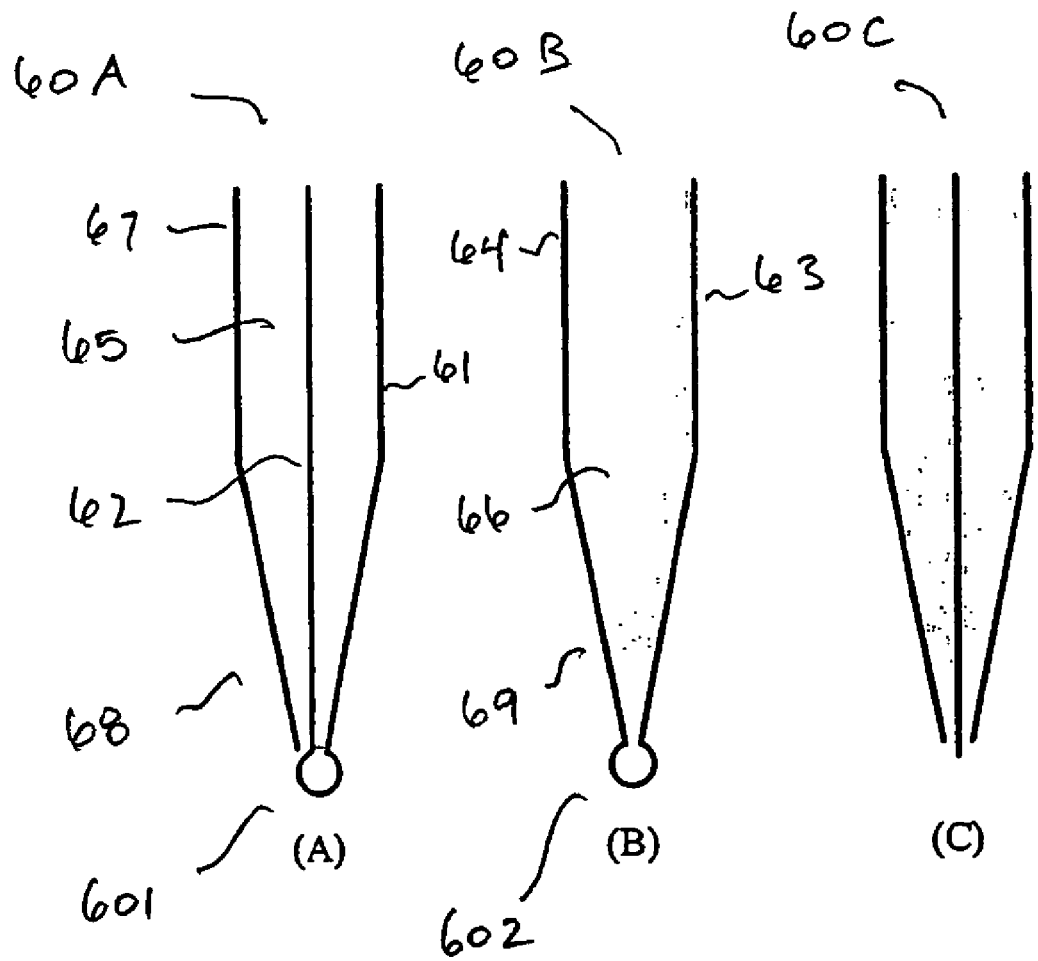
FIGS. 6A-C illustrate how the distal end of a transmission line probe tip may be tapered to increase spatial resolution.

The schematically illustrated exemplary loop structure can also be used with a transmission line type probe, such as the exemplary transmission line 60A illustrated in FIG. 6A, or transmission line 60B illustrated in FIG. 6B. The transmission lines 60A, B include two conductive lines 61, 62 and 63, 64, respectively. Optionally, a dielectric insulating material 65, 66 can be placed between and/or around such conductive lines. Transmission line 60A can further include a shield electrode 67 connected, for example, to ground, as shown in FIG. 6A. The front end 68, 69 of the transmission lines 60A, B, is optionally tapered down to increase spatial resolution, and a conductive loop 601, 602 is attached thereto. The tapered region of the transmission line may be positioned at a distal end of the structure, such as a distal end from a housing, a mounting surface, a control surface, or a clamping structure supporting and/or manipulating the transmission line. In one exemplary embodiment, the transmission line is substantially configured as a coaxial cable. For such a coaxial cable, the loop is connected to the center conductor and outside shielding layer. Referring to the structure illustrated in 60, FIG. 6B, the loop is connected to the two conductive lines. The examplary probes 60A, B illustrated in 6A, FIG. 6A AND FIG. 5B may each include two conductive lines (not shown). However, multiple pairs of conductive lines can he used in each exemplary embodiment, e.g., four conductive lines in each exemplary embodiment, each pair of lines optionally having a conductive loop.

Optionally, the transmission line type probe with a tapered region of the transmission line may be positioned at a distal end of the structure may not include a conductive loop at the end of the tip. Such an embodiment is shown in FIG. 6C.

Figure 7A:
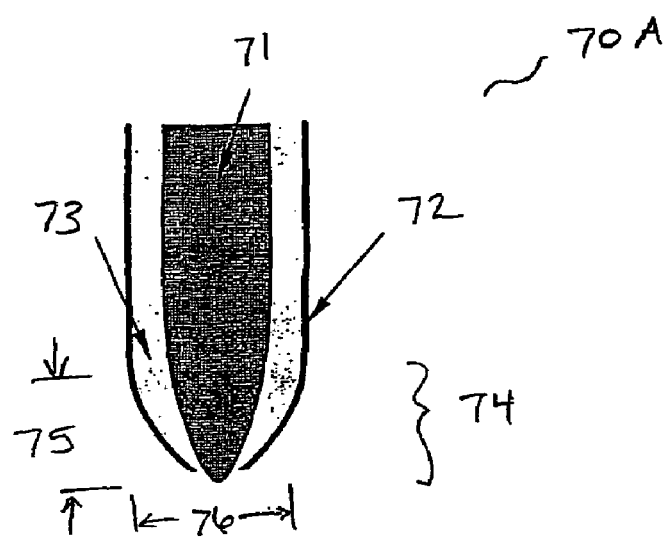
FIGS. 7A-B show detailed structures of coaxial probe tips that are shielded; with a small and wide angle of tapering, respectively.

Detailed structures of a coaxial shielded tip having a tapered region are shown in FIGS. 7A, B. The probe tip shown generally at 70 A in FIG. 7A comprises a center conductor 71, a shielding 72, and an insulating material 73A positioned outside of the conductor 71, but inside of the shielding 72. The tapered region shown generally at 74 in FIG. 70A is "bullet-shaped," and is configured such that the length 75 of the tapered region 74 is about on the order of the dimension of the diameter of the tip (center conductor 71 plus insulating material 73A), wherein the diameter is represented by reference numeral 76 in FIG. 7A.

Figure 7B:
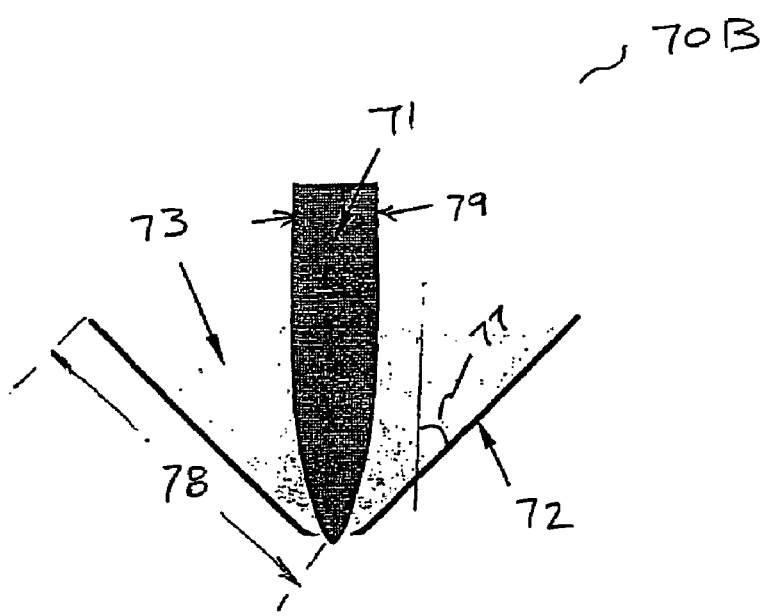

A different configuration of a tapered tip is shown in FIG. 7B, where the probe tip shown generally at 70B has substantially the same center conductor 71, surrounded by an insulating material 73B (which may be the same type of insulating material as insulating material 73A, but of course will be in a different shape). The taper of probe 70B may best be described by the angle 77 that the shielding 72B makes with a center line of the center conductor 71. In embodiments of the present invention, angle 77 ranges from about 10 to 90 degrees. The configuration of the tapered region of probe 70B may also be characterized by the length 78 of the taper; in embodiments of the present invention, length 78 may range as anywhere from one half of the diameter 79 of the central conductor 71, to 100 times the diameter 71.

Figure 8A:
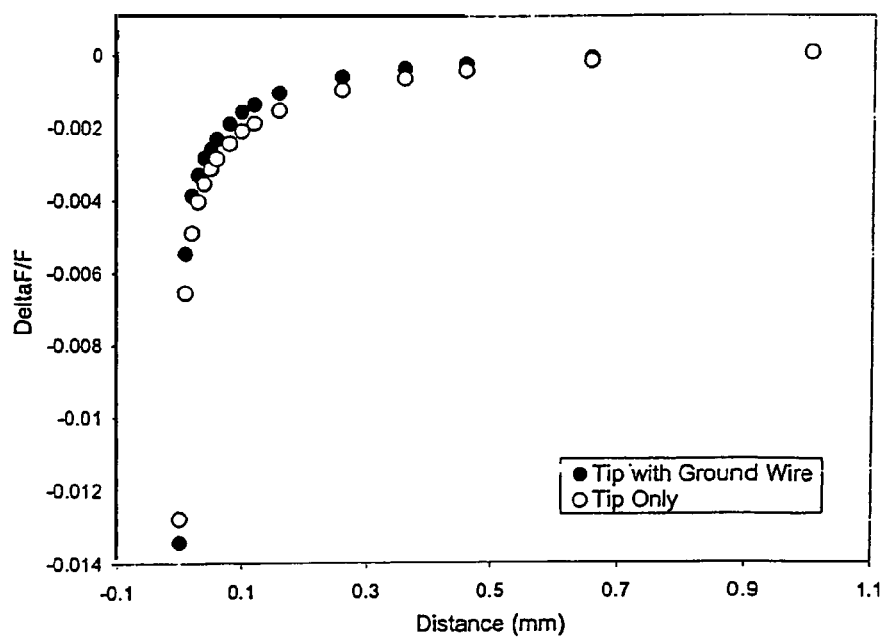
FIGS. 8A-B are graphs illustrating the resonant frequency change of an exemplary EWP as the probe tip approaches a metal sample surface; the curves in FIG. 8A compare an open tip and a ground wire balanced tip; the two curves in FIG. 8B compare an open tip to a tip with shielding.
Figure 8B:
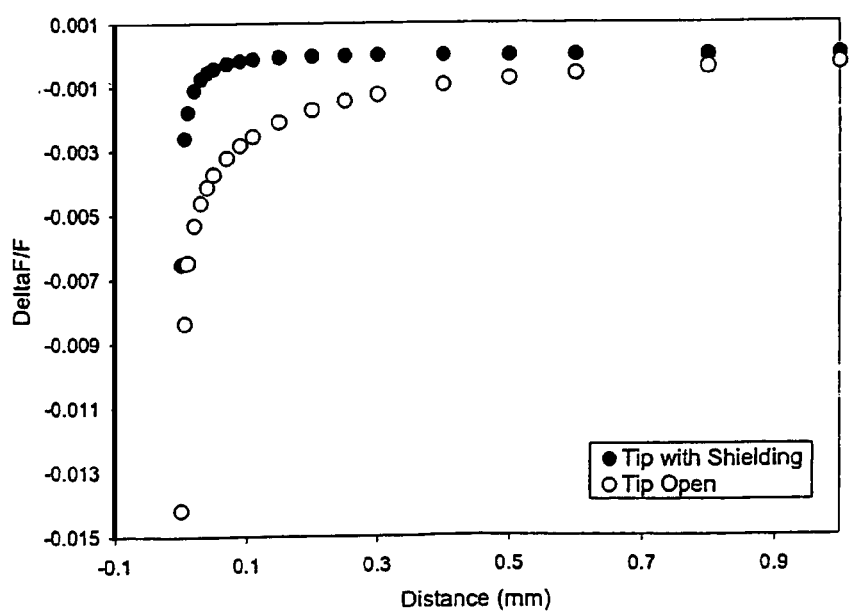

Exemplary data illustrating the effectiveness of shielding the tip is shown in FIGS. 8A-B. FIG. 8A is a graph of the resonant frequency change of an evanescent wave probe as the tip of the probe approaches a metal surface; the two curves of the graph (open circles and closed circles) are a comparison between an open tip, and a ground wire balanced tip such as the tip depicted in FIG. 2.

FIG. 8B is a graph of the resonant frequency change of an EWP as the tip approaches a metal surface; these two curves compare a probe having an open tip (open circles in the graph) and a probe having a tapered coaxial shielded tip (filled in circles). The dramatic difference between the two curves indicates that a coaxially shielded tip is influenced much less by far field effects, and thus has a much higher resolution.

EMP with Actively Controlled Feedback Loop

One side effect of the shielding design for an evanescent microwave probe (as used herein, the terms evanescent wave probe, or EWP, and evanescent microwave probe, or EMP will be used interchangeably) is a reduced signal-to-noise ratio. Shielding the probe in a manner consistent with any of the embodiments described above increases the close-distance-overlapping area between the center tip and the shielding, which increases the transition line loss as microwave current flows through these structures. The quality factor of the resonator decreases due to this extra loss, which in turn causes the signal-to-noise ratio of the probe to decrease.

To overcome this problem, an active feedback technique is introduced here to increase the signal-to-noise ratio of the EMP. Active feedback techniques in general are known in the art, and have been broadly used in the low frequency and RF detection as an effective way to increase the sensitivity. See, for example, T. R. Albrecht et al., J. Appl. Phys. 69, 668 (1991); U. Durig et al., J. Appl. Phys. 82, 3641 (1997); and K. Weyand, IEEE Trans. Instrum. Measurem., 38, 410 (1989).

Figure 9A:
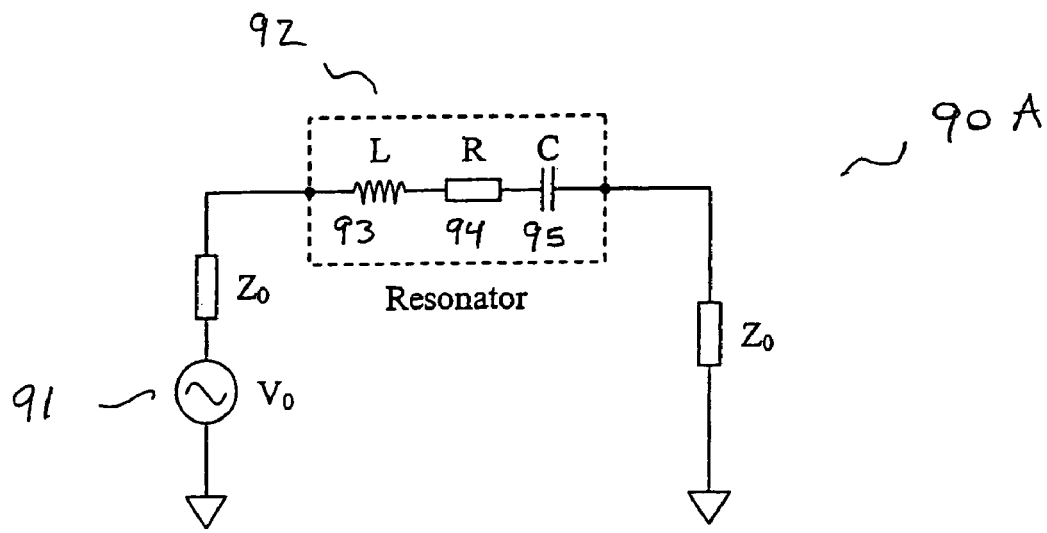
FIG. 9A is an equivalent circuit of conventional resonator with a signal source and detector connected; the signal source has internal impedance $Z_0$ and signal amplitude $V_0$; the detector has impedance $Z_0$; and the equivalent inductance, capacitance and resistance of the resonator are L, C and R, respectively.

According to the present embodiments, an RF/microwave feedback loop is inserted between the input and output of the resonator. These concepts are illustrated schematically in FIGS. 9A-B. FIG. 9A is an equivalent circuit of conventional resonator shown generally at 90A, the conventional resonator having connected thereto a signal source 91 and detector. The signal source has internal impedance $Z_0$, typically about 50 ohms, and signal amplitude $V_0$; the detector has impedance $Z_0$; and the equivalent inductance 93, capacitance 94, and resistance 95 of the resonator 92 are L, C and R, respectively.

Figure 9B:
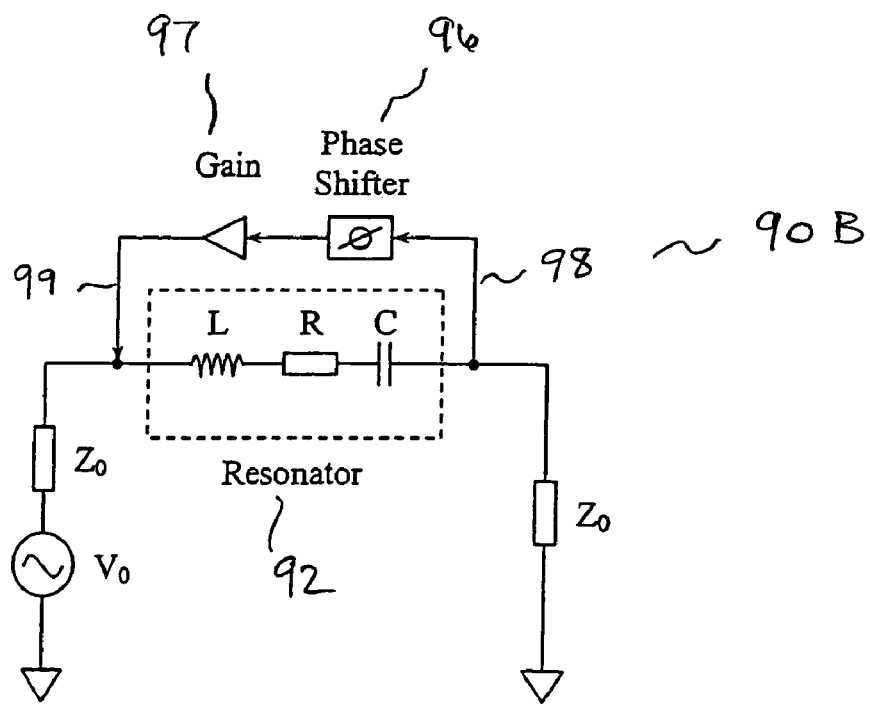
FIG. 9B is an equivalent circuit of oscillator further including the inventive actively controlled feedback loop; in this embodiment the feedback loop comprises a resonator, a phase shifter and a gain amplifier.

FIG. 9B is an equivalent circuit of an oscillator further including the inventive actively controlled feedback loop; in this embodiment the feedback loop comprises a resonator 92, a phase shifter 96, and a gain amplifier 97 to comprise an actively controlled feedback loop 90B. The phase and gain of the feedback loop 90B are adjusted to values wherein both the intensity and effective quality factor of the original resonator 90A can be substantially increased. Increasing the intensity and effective quality factor of the resonator has the effect of improving the signal-to-noise ratio of the EWP.

Figure 10:
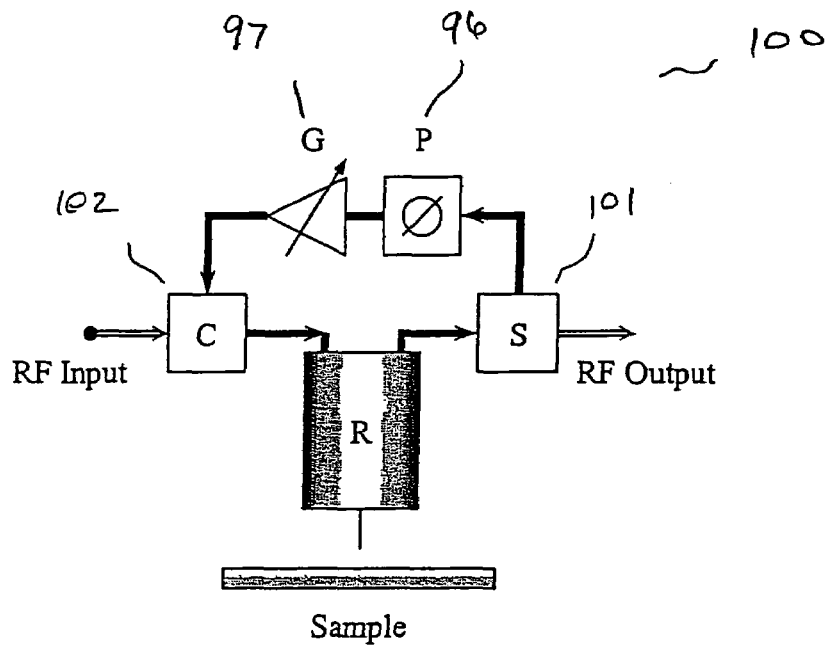
FIG. 10 is a schematic diagram of an exemplary EWP measurement system with the active feedback controlled resonator, further including a combiner and a splitter as part of the feedback loop.

Two ways in which an active feedback loop may be added to an EWP resonator will be discussed next. In the first approach, an active feedback loop is added to the resonator to form a passive device with an increased effective Q. When this approach is used, it is necessary to provide a microwave source to the system to drive the resonator. FIG. 10 shows an embodiment of an EWP measurement system 100 with an active feedback controlled resonator, the feedback loop comprising a phase shifter 96 and gain amplifier 97, and further comprising a splitter 101 and a combiner 102. The electrical delay line or phase shifter 96 may be either fixed or variable, and is used to adjust the phase shift between the output port and input port of the resonator to 0° (which is the same thing as 360°) or any other phase for any special purpose. The RF amplifier 97 is adjusted to obtain a high Q value for the resonator.

Figure 11:
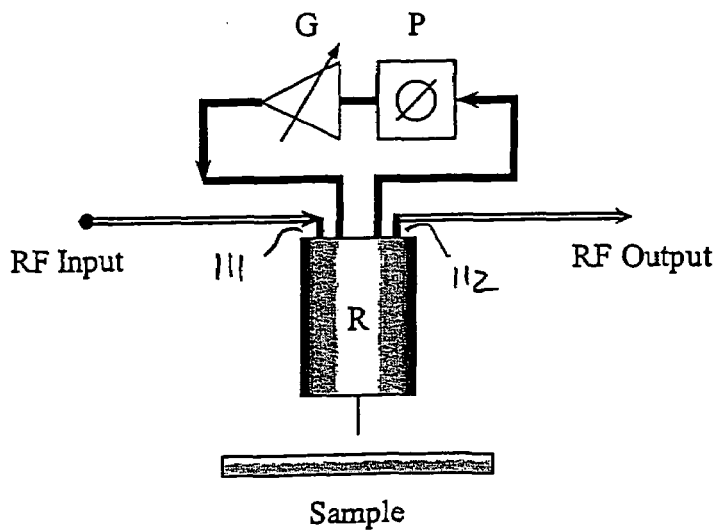
FIG. 11 is a schematic diagram of an exemplary EWP with an active feedback loop similar to that shown in FIG. 10, except that two coupling ports of the resonator have been used to replace the combiner and splitter of FIG. 10.

In a different configuration of the first way that an active feedback loop may be added to the EWP resonator, the splitter and combiner can be eliminated and replaced with two more resonator coupling ports 111, 112, as shown in FIG. 11. In either of these two configurations, the feedback loop may be integrated with the resonator, or setup as a separate structure from the resonator.

When measurements of impedance or magnetic susceptibility are desired, an input signal source is needed for excitation. If, on the other hand, it is desired to construct an electromagnetic field profile, then no input signal is required. The EWP tip (which may be configured either as an open tip or a loop tip) will pick up a local field signal proportional to the intensity of the field. The field components along different directions also can be mapped by implementing different orientations of the tip.

Figure 12:
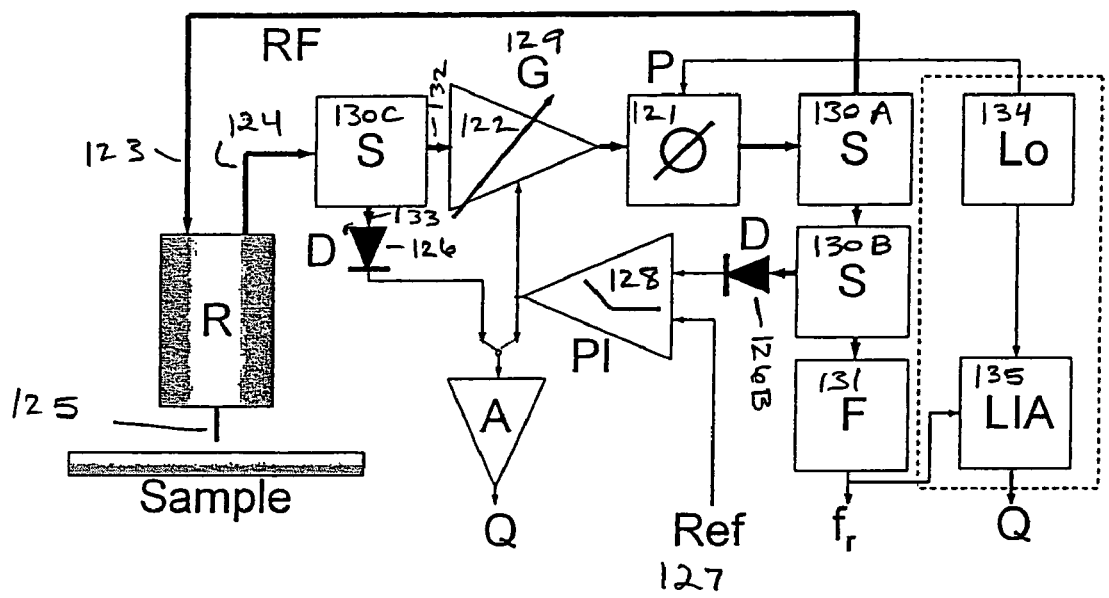
FIG. 12 is a schematic diagram of an exemplary EMP measurement system with an active resonator functioning in a self-oscillating mode.

In the second approach, an active feedback loop is added to the resonator to form a self-oscillator with an oscillating frequency substantially equal to, or close to, the original resonant frequency of the resonator. The driving microwave is no longer necessary in this method. FIG. 12 is an exemplary setup of such a system. A phase shifter 121 and a variable gain amplifier 122 is added between the input and output ports (123, 124, respectively) of the resonator to realize the positive feedback at or close to the original resonant frequency of the resonator such that the self-oscillation (RF) is generated inside the feedback loop and the probe tip 125. To control the amplitude of the self-oscillation, the power of the microwave is measured by a diode detector 126, and compared with a reference value 127. The error signal is then processed by a proportional integral amplifier 128 to adjust the gain of 129 so that the microwave power is locked at a constant value. Several splitters 130A, 130B, 130C are used in the microwave path in order to channel the microwave signal to different detectors.

Measuring the Complex Impedance of a Sample

Next, a discussion of the measurement of complex impedance will be given, again referring to the resonator with an active feedback loop of the second approach; that is to say, in the form of a self-oscillator, as shown in FIG. 12. Both the resonant frequency ($f_r$) and the quality factor (Q) of the active resonator need to be measured in order to calculate the complex impedance of the sample. The relationship of $f_r$, Q, and the sample impedance is well developed in the pervious art (see, for example, U.S. Pat. Nos. 6,173,604 and 6,532,806) and is not described here.

The resonant frequency is measured by the frequency detection electronics 131, which can be any method commonly used in the art to measure a resonant frequency in the RF or microwave range, such as a digital frequency counter, a gated timer, a phase-locked loop, or various analog FM demodulator circuits.

There are also several ways to measure the Q of the resonator. Three will be discussed in this disclosure. A first method for measuring the Q of the resonator relies upon the fact that Q is a function of the microwave output power of the resonator at constant input power with fixed couplings. The higher the output power, the higher the Q. To implement this method, a splitter 130C is used at the resonator output 124 to separate the microwave signal evenly or unevenly into two paths. One path 132 is for the active feedback loop. The other path 133 transfers a portion of the signal to the diode detector 126 to measure the power; this parameter is needed for the calculation of the Q of the resonator.

A second method for measuring Q makes use of the fact that since the output power of the resonator changes with the Q of the resonator, the gain of the variable gain amplifier 129 will change correspondingly in order to keep the output power of the amplifier substantially constant. Therefore, the Q measurement may be effected by monitoring the feedback gain of the amplifier 129. An advantage of this second method for measuring Q, relative to the first, is that this second method requires one less splitter 130, and one less diode 126B. However, an inherent disadvantage with this second method is that it may be more complicated to convert the gain value to Q, especially when the gain of the amplifier 129 is nonlinearly proportional to its control voltage.

A third method for measuring Q involves an AC modulation technique. A low frequency AC signal is generated by a function generator 134 to modulate the phase of the phase shifter 121. This in turn induces a modulated shift on the resonant frequency, which may be detected by a lock-in-amplifier 135. Since the resonant frequency shift is proportional to the phase shift amplitude and inversely proportional to the Q of the resonator, the frequency modulation amplitude detected by the lock-in amplifier 135 may be used to calculate the Q of the resonator. As long as the frequency detection circuit is fast enough, the AC modulation technique of this third method can provide the best sensitivity relative of the three methods.

Analysis of the Active Feedback Resonator

In this section, the operation of the active feedback resonator is analyzed for a resonator is being operated in a passive manner. The equivalent circuit of a conventional resonator was shown in FIG. 9A, the resonator having a signal source 91 and detector 92. Assuming the signal source 91 and the detector 92 have the same impedance $Z_0$, the signal across the detector $V_s$ under a driving voltage $V_0$, is, $$\frac{V_S}{V_0} = \frac{Z_0}{R + 2Z_0 + i\omega L + \frac{1}{i\omega C}} \quad (1)$$

$$= \frac{Z_0}{R + 2Z_0} \frac{1}{1 + 2iQ_l \frac{\Delta\omega}{\omega_0}}$$

where $\Delta\omega = \omega - \omega_0$, $\omega_0$ is the resonant frequency, and $Q_l$ is the loaded quality factor as defined below:

$$\omega_0 = \frac{1}{\sqrt{LC}} \quad (2)$$

$$Q_l = \sqrt{\frac{L}{C}} \frac{1}{R + 2Z_0} \quad (3)$$

When the present active feedback loop is added to the resonator circuit, as previously shown in FIG. 9B, the output signal 98 of the resonator is fed into the phase shifter 96 and an RF amplifier 97, and the output 99 of the RF amplifier is added back to the resonator's input port. The circuit may be analyzed theoretically as follows: assuming the output impedance of the amplifier is also $Z_0$, then, $$V_S = (V_0 + ge^{i\varphi}V_S)\frac{Z_0}{R + 2Z_0 + i\omega L + \frac{1}{i\omega C}},$$

where g and φ are the gain and phase shift of the feedback loop, respectively Pratically speaking, g and φ may be adjusted from about 0 to 10,000 and 0° to 360°, respectively. By solving the above equation, it is possible to obtain:

$$\frac{V_S}{V_0} = \frac{Z_0}{R + 2Z_0 - gZ_0\cos(\varphi)} \frac{1}{1 + 2iQ'\frac{\Delta\omega}{\omega'_0}} \quad (4)$$

where $\Delta\omega = \omega - \omega'_0$, $\omega'_0$ and Q' are the effective resonant frequency and quality factor, $$\frac{\omega'_0}{\omega_0} = \sqrt{1 + \alpha^2} + \alpha \quad (5)$$

$$Q' = \frac{\omega'_0 L + \frac{1}{\omega'_0 C}}{2(R + 2Z_0 - gZ_0\cos(\varphi))} \quad (6)$$

and $$\alpha = \frac{1}{2}gZ_0\omega_0 C\sin(\varphi) \quad (7)$$

where $\omega_0$ is resonator's intrinsic resonant frequency when a feedback-loop is not present.

If φ equals zero, it may be shown that:

$$\omega_0' = \omega_0 \quad (8)$$

$$Q' = Q_l \frac{1}{1 - gZ_0/(R+2Z_0)}$$

$$\frac{V_S}{V_0} = \frac{Z_0}{R+2Z_0} \cdot \frac{1}{1 - gZ_0/(R+2Z_0)}$$

It will be understood by those skilled in the art that the quality factor has been increased by a factor of $$\frac{1}{1 - gZ_0/(R+2Z_0)}.$$

Thus, it is possible to achieve an effective Q' much higher than the original $Q_1$ by adjusting the feedback gain g under the condition that $gZ_0/(R+2Z_0)<1$. Similarly, the output amplitude at the resonant frequency is increased by the same factor. The increase in both Q and the amplitude will improve the signal-to-noise ratio of the resonator. A further point to be made is that if the condition $gZ_0/(R+2Z_0) \geq 1$ exists, then a self-oscillating condition appears in the feedback loop, and when this happens, it is no longer advisable to use the device in a passive mode. This is not to say that the device cannot be used in a self-oscillation mode; in fact it can, as will be described later.

It will be understood by one skilled in the art that when φ is not zero in equations 5 and 7, the resonator can be tuned to specified resonant frequency and quality factor by choosing appropriate values for φ and g. Furthermore, if φ and/or g are functions of frequency, expressed mathematically as φ(ω) and/or g(ω), it is possible to influence the spectral shape of either the resonator output amplitude or phase. For example, inside the bandwidth, by making the gain g lower at a resonant frequency $\omega_0'$ and higher for any other frequency, to is possible to obtain a flat output inside the bandwidth. This feature provides the potential for an application that uses an active resonator as a tunable band-pass filter.

When the active resonator is working in self-oscillating mode, the microwave source is no longer necessary to provide the driving signal. The self-oscillation in the loop maintains its oscillation under a fixed resonant frequency. This mode may be analyzed again with the equivalent circuit shown in FIG. 9B, but with the input impedance $Z_0$ becoming infinitely large and the driving signal $V_0$ going to zero. In this case, the equation (1) shown previously for $V_s/V_0$ is no longer meaningful, since $V_0$ is now zero. However, it is possible to use a transfer function T(ω) to describe the system, wherein the transfer function may be expressed as:

$$T(\omega) = \frac{1}{1 + \frac{R}{Z_0} - g\cos(\varphi)} \cdot \frac{1}{1 + 2iQ'\frac{\Delta\omega}{\omega_0'}} \quad (9)$$

with $\Delta\omega = \omega - \omega_0'$, $\omega_0'$ defined as the same quantity as previously shown in equations (5) and (7). The effective quality factor Q' is different from the definition in equation (6) since the input impedance is no longer there:

$$Q' = Q_l \frac{\frac{1}{2}\left(\frac{\omega_0'}{\omega_0} + \frac{\omega_0}{\omega_0'}\right)}{\left(1 - \frac{g\cos(\varphi)}{1 + \frac{R}{Z_0}}\right)} \quad (10)$$

$$Q_l = \sqrt{\frac{L}{C}} \frac{1}{R+Z_0} \quad (11)$$

Similar to the previous situation, where the resonator was being operated in a passive mode as described by equations (6) and (8), in this case of the resonator acting as a self-oscillaror, Q' is increased by a factor of $$\frac{1}{1 - \frac{g\cos(\varphi)}{1+R/Z_0}}$$

relative the original $Q_1$. As before, this increase in Q' can substantially increase the signal-to-noise ratio of the resonator.

According to equation (9), the resonator self-oscillates when T(ω) goes to infinity while its imaginary part is zero. Such a condition may be expressed equivalently by the following equation:

$$1 + \frac{R}{Z_0} = g\cos(\varphi) \quad (12a)$$

$$\omega = \omega_0' = \omega_0(\sqrt{1+\alpha^2} + \alpha) \quad (12b)$$

where α is defined by equation (7)

The amplitude condition described by equation (12a) ensures that the oscillation amplitude is constant. This function is performed by the auto-gain control circuit, as described by the disclosure of FIG. 12. The phase condition exemplified by equation (12b), on the other hand, determines the frequency of the self-oscillation. Understanding that the phase shift between the input and output ports of the resonator $\phi_r = 0$ at the resonator's resonant frequency, it will be apparent to one skilled in the art that the oscillation frequency ($\omega_0'$) is, in general, different from the resonant frequency ($\omega_0$) of the resonator unless the phase of the feedback amplifier (φ) matches the phase $\phi_r$.

To understand the phase condition in more detail, equation (12b) may be expressed in a simpler form. The first step is to rewrite equation (7) as:

$$\alpha = \frac{1}{2Q_l} \cdot \frac{g}{1 + \frac{R}{Z_0}} \sin(\varphi) \quad (13a)$$

Under self-oscillation, where equation (12a) applies, the parameter a may be written as:

$$\alpha = \frac{1}{2Q_l} \cdot \tan(\varphi) \quad (13b)$$

In most of cases, $Q_l \gg 1$, and equation (12b) may therefore be expressed as:

$$\omega = \omega_0' \approx \omega_0\left(1 + \frac{1}{2Q_l}\tan(\varphi)\right) \quad (14)$$

This new resonant frequency is a function of $Q_1$ and $\phi$. If a modulation signal is imposed on $\phi$, and the relative frequency modulation is detected through the lock-in amplifier 135, the $Q_1$ of the resonator may be calculated though the phase derivative of equation (14), with very high sensitivity. It may also be seen from equation (10) that under oscillation the Q' becomes infinitely large under the conditions of equation (12a). It will be readily apparent to those skilled in the art that a resonator with a narrow resonant peak be very sensitive to the frequency change.

Theoretical analysis shows that the sensitivity of an EWP-based instrument is proportional to the Q of the resonator. High sensitivity may be achieved by using an EWP resonator with a high Q. In most cases, the Q of the resonator is limited by the microwave energy loss on the metal conductors that make up the resonator. In order to achieve a high Q for a resonator, it is preferable to utilize high conductivity metal parts within the resonator, and preferably the dimensions of the resonator are designed to be large. Practically speaking, the Q of the resonator ranges from about one hundred to three thousand.

In many situations resonators having small dimensions are desired and/or required, in which case the Q of the resonator may be relatively low. Such a resonator may be used with the present active feedback loop to increase the quality factor of EWP resonator, and thus increase the instrument's sensitivity. Typical, the amount that the quality factor is increased from Q to Q' by the active feedback technique is in a range from about 1 to 10,000. Inclusion of the present active feedback loop also makes it possible to decrease the EMP probe size, in some instances dramatically, to therefore enable the integration of EMP with AFM, STM, MFM or other microscope devices.

EWP Measurements and Potential Applications

As alluded to before, the EWP instrument may be used to measure electrical impedance, magnetic susceptibility, and electromagnetic field profiles. During the measurement of such materials paramaters, it is often desirable to provide a tunable narrow band measurement system such that sensitive measurements may be taken at different frequencies.

In communication systems, for example, it is often desirable to have a front-end narrow band-pass filter having a center frequency that is within the service band to different channels, to accommodate call-management. Such a device will allow only the signal to pass while rejecting interference and noise. This type of device can be formed by incorporating a tunable dielectric material into a microwave resonator. By applying a high electrical field across the tunable dielectric material, the dielectric constant of the tunable dielectrics will change, thereby changing the resonant frequency of the resonator.

The absence of low loss microwave tunable dielectrics is a problem that has not yet been addressed by the prior art. Another issue the prior art has not adequately addressed is that two key performance parameters, namely the required tuning voltage and the quality factor of the resonator (Q), are generally in conflict with oneother, which prevents an optimum design to be available for practical devices. The use of a low tuning voltage is desirable for cost and safety reasons. However, a device with high Q is also desirable for selectivity and sensitivity reasons. To implement a low tuning voltage, it is useful to employ two closely spaced metal electrodes with tunable dielectrics positioned between the two electrodes, but placing the two electrodes too close together will increase metal loss of the signal, and decrease the resonator Q. As a consequence, previous approaches have failed to simultaneously provide a tunable resonator with high Q that can also operate with the low tuning voltage that is desired.

One such application is to apply the present active feedback loop to increase the Q (or decrease the bandwidth) of a tunable filter. The setup is similar to that of any of the EMP embodiments previously described, such as those shown in FIG. 10 or FIG. 11. In those embodiments, the EMP resonator will be replaced by a tunable filter, and the RF amplifier (e.g., RF amplifier 97) is adjusted to obtain the desired bandwidth. The feedback loop cannot only change the Q of the filter, but it can also tune the filter's effective resonant frequency.

This implies that two other configurations for a tunable filter are practical. One of such configuration involves tuning both the filter itself, and the phase of feedback loop. The total tuning scale would be the sum of all tuning, and will increase the tuning range of the tunable filter. Another setup is to use a fixed frequency resonator filter but adjust the phase shift of the feedback loop to make the filter tunable. The relationship between frequency tuning and phase change is shown in equation (5). This method can be used on the filters, which can not be tuned otherwise. One of the examples is the FBAR (Film Bulk Acoustic Resonator) developed by Agilent Technologies, which can achieve high Q and coupling coefficients by coupling the RF or microwave signal to a high Q mechanical (acoustic) resonance with small size. However, one of the disadvantages is that the resonant frequency of FBAR cannot be tuned with conventional methods. The active feedback controlled resonator technology presently disclosed can be used to build tunable filters with FBAR while simultaneously maintaining the advantages of FBAR.

In all above cases, the Q (or bandwidth) of the filter may change when the filter is tuned. To keep constant Q or bandwidth or any other desired behavior, the feedback loop gain needs to be adjusted simultaneously with frequency tuning. As indicated in theoretical analysis section, the output spectra shape can also be changed by choosing the appropriate relationship of feedback gain or/and phase shift with frequency. This makes it possible to build a filter with a flat pass band.

Many modifications of the exemplary embodiments of the invention disclosed above will readily occur to those skilled in the art. Accordingly, the invention is to be construed as including all structure and methods that fall within the scope of the appended claims.

What is claimed is:

1. An evanescent wave probe, comprising:
   a transmission line type probe having two conductive lines isolated by a dielectric insulating material, wherein the dielectric material is tapered down toward a distal end; and
   wherein a conductive loop connects the two conductive lines at the distal end, the conductive loop configured to inductively couple evanescent electromagnetic waves from the probe to an adjacent sample.

2. The evanescent wave probe of claim 1, wherein the transmission line is substantially configured as a coaxial cable having a center conductive line and a cable shielding, wherein the conductive loop at the distal end is electrically connected to the center conductive line and the cable shielding.

3. The evanescent wave probe of claim 1, wherein the probe is coupled with an active controlled feedback loop inserted between the input and the output of the probe to enhance the signal-to-noise ratio of the probe; the feedback loop comprising at least a phase shifter and a gain amplifier.

4. The evanescent wave probe of claim 3, wherein the active feedback loop is coupled to the probe through a power splitter and a power combiner.

5. The evanescent wave probe of claim 3, wherein the active feedback loop is coupled to the probe through at least one additional input and at least one additional output ports.

6. The evanescent wave probe of claim 3, further including a microwave source to drive the probe, and wherein the probe is configured to operate in a passive mode.

7. The evanescent wave probe of claim 3, wherein the active feedback loop is configured to function as a self-oscillator.

8. The evanescent wave probe of claim 3, wherein the active feedback loop is configured to self-oscillate at a frequency that is substantially the same as the resonant frequency of the probe.

9. The evanescent wave probe of claim 3, further comprising a microwave source to drive the probe, wherein the feedback loop is configured such that the quality factor of the probe is increased by a factor ranging from about one to about $$\frac{1}{1 - gZ_0/(R + 2Z_0)},$$

wherein g is the gain of the amplifier in the feedback loop, $Z_0$ is the output and input impedance of the microwave source and detector, and R is the equivalent serial resistance of the probe.

* * * * *